Patented Oct. 19, 1926.

1,603,696

UNITED STATES PATENT OFFICE.

MONE R. ISAACS, OF PHILADELPHIA, PENNSYLVANIA, ASSIGNOR TO UNITED PRODUCTS CORPORATION OF AMERICA, A CORPORATION OF DELAWARE.

PRESERVATIVE COMPOSITION.

No Drawing. Application filed July 17, 1919. Serial No. 311,567.

The object of my invention is to provide a new and useful preservative substance or composition useful as a preventive, retarder or repellent, of decay, waste, disintegration, deterioration, degeneration, dissociation, fermentation, molding, bacterial action, hardening, segregation, deliquescence, crumbling, corrosion and other destructive and detrimental actions or effects, when applied or used in conjunction or in combination with proteinous, dextrinous, albuminous, gelatinous and similar substances, and preferably casein, glues, starch, sizings, gums, and similar materials, or compositions or compounds containing the same as an essential ingredient or component.

Another object is to provide a new and useful substance adapted to be used as a germicidal, insecticidal, bactericidal, vermin-killing or other similarly destructive substance.

Another object is to provide a preserving composition adapted to be readily added to or mixed with any of the substances to be preserved thereby, such as casein, glue, starch, sizing, adhesives, coating compounds, and so forth, which ordinarily are in substantially dry powdered or granulated form, without substantially altering such form and which will increase the permanence or the chemical stability of the substance to be preserved or protected.

I have discovered that by combining with compositions comprising a casein or other proteinous or albuminous substances, as an essential ingredient a relatively small amount of certain organic substance, such as and preferably, naphthalene, a composition may be obtained which does not deteriorate or otherwise decompose even after standing for an indefinitely long period of time, as several months, in open or unprotected receptacles or containers or in the open, exposed to the atmosphere, such composition, however, being adapted to readily mix with water or other appropriate solvent to form an excellent adhesive paste, glue, size, paint, coating composition or the like notwithstanding such a lapse of time.

The organic substance which I have found to be particularly effective, efficacious and efficient for the purpose mentioned are comprised in that class of organic compounds known as the benzene hydrocarbons and comprising more particularly of the derivative compounds of such class and relating more specifically to the naphthyl group. I prefer to use naphthalene ($C_{10}H_8$) itself, but I do not wish to limit myself to this particular substance, inasmuch as other naphthyl or benzene aromatic derivatives may be equally useful to produce the desired result.

In carrying my invention into practice I mix or dissolve the naphthalene, naphthalene oil or its equivalent in a suitable solvent, such as a light oil, to any point of saturation, and to this solution I add a quantity of heavy oil. A relatively small quantity of this mixture may then be added to the substance to be preserved or protected, as for example, casein, casein compositions, such as casein, lime and a fluoride, with or without calcium or magnesium or both, casein glues or adhesives, casein sizings, casein coating compositions and so forth.

As a solvent for the naphthalene or the naphthylic substance I may use any light oil, spirits, essence, carbonchloride derivatives such as carbontetrachloride, carbonbisulphide and the like. As light oils, I may use any light mineral or paraffine oil, essential oil, light vegetable oil, light animal oil, coal-tar distillates and similar substances. Examples of the light mineral oils are, benzine, gasolene, kerosene and similar substances. Examples of the light vegetable oils are, spirits of terpentine, cotton seed oil and similar substances. Examples of coal-tar distillates are benzene or benzol, toluol, xylol, coal-tar, dead oil such as remains after naphthalene has been removed therefrom, creosote and similar substances.

The above solution may then be mixed with heavy oil in the proportions by weight of about five (5) to fifty (50) parts of the said solution and from ten (10) to one hundred (100) parts of the heavy oil.

Examples of heavy oil are terpentine with terpene, spirits of terpentine, terpene, any of the lubricating oils, any of the heavy mineral oils such as spindle oil, paraffine oil, and other similar substances.

In using this mixture as a preservative, as for example, with casein, or casein compositions, comprising adhesives, coatings, sizings and the like, I mix or incorporate from one half (½) to fifteen (15) parts by weight of the above mixture with one hundred (100) parts of casein or similar substances. This resulting mixture may be produced in the form of a semi-solid mass or cake which will remain indefinitely in that form, and which will readily dissolve in water or appropriate alkaline solvent therefor, as may be required for the particular use intended, as when certain substances, such as lime and fluoride, are added thereto, and be fully as efficient or efficacious as a freshly prepared composition, notwithstanding the fact that the same may have been exposed for a long period of time.

More specifically, I preferably prepare such compositions by first dissolving in the proportions by weight of fifty (50) parts naphthalene in one hundred (100) parts of benzol or benzene and then adding to this solution fifty (50) parts of paraffine-oil. Of this composition or mixture I take one (1) part by weight to one hundred (100) parts by weight of casein.

When, however, the preserving composition is to be used as a germicide or the like, the same may be applied to paper or similar impregnable material, which, when thus treated, may be placed in localities infested by germs, insects, moths or other vermin for their destruction or annihilation, or, if desired, such composition may be sprayed upon trees, bushes, plants, vegetable and plant growths or like organisms, and the like or otherwise used as may be determined upon for the purpose herein disclosed.

While I have described above the manner in which my preserving composition may be produced and applied to materials to be preserved thereby, such description is intended as exemplifying rather than limiting my invention, and it is to be understood that the materials, their proportions and the order in which the steps are enumerated may be suitably varied, without departing from the spirit of my invention and the scope of the appended claims.

Having thus described my invention what I claim and desire to protect by Letters Patent is:

1. A composition of matter containing by weight from two to fifty parts of a saturated solution of a light mineral oil and naphthalene, from ten to one hundred parts of a heavy oil and several thousand parts of casein.

2. A composition of matter containing by weight fifty parts of naphthalene, one hundred parts of benzol, fifty parts of paraffine oil and twenty thousand parts of casein.

3. The method of preserving casein without detracting from its essential properties as a substantial ingredient of adhesives, sizings and the like, which consists in dissolving naphthalene in a light mineral oil, adding thereto substantially 30% of the weight of the naphthalene solution of a heavy oil, and then adding one part by weight of the resulting composition to more than one hundred parts by weight of casein.

In witness whereof, I hereunto set my hand this 15th day of July, 1919.

MONE R. ISAACS.